US010686806B2

United States Patent
Abbaszadeh et al.

(10) Patent No.: US 10,686,806 B2
(45) Date of Patent: Jun. 16, 2020

(54) MULTI-CLASS DECISION SYSTEM FOR CATEGORIZING INDUSTRIAL ASSET ATTACK AND FAULT TYPES

(71) Applicant: General Electric Company, Schenectady, NY (US)

(72) Inventors: Masoud Abbaszadeh, Clifton Park, NY (US); Lalit Keshav Mestha, North Colonie, NY (US); Weizhong Yan, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 15/681,827

(22) Filed: Aug. 21, 2017

(65) Prior Publication Data

US 2019/0058715 A1 Feb. 21, 2019

(51) Int. Cl.
*H04L 29/06* (2006.01)
(52) U.S. Cl.
CPC ............................... *H04L 63/1416* (2013.01)
(58) Field of Classification Search
CPC .................................................. H04L 63/1416
See application file for complete search history.

(56) References Cited

U.S. PATENT DOCUMENTS

| | | | | |
|---|---|---|---|---|
| 7,225,343 | B1 * | 5/2007 | Honig | G06F 21/554 713/194 |
| 2014/0283047 | A1 * | 9/2014 | Dixit | G06F 21/55 726/23 |
| 2014/0289852 | A1 * | 9/2014 | Evans | G06F 21/55 726/23 |
| 2017/0251012 | A1 * | 8/2017 | Stockdale | H04L 63/1441 |
| 2017/0264629 | A1 * | 9/2017 | Wei | H04L 63/1433 |
| 2018/0157831 | A1 * | 6/2018 | Abbaszadeh | G06F 21/552 |
| 2018/0157838 | A1 * | 6/2018 | Bushey | G06F 21/57 |
| 2018/0276375 | A1 * | 9/2018 | Arov | H04L 63/1416 |
| 2019/0041845 | A1 * | 2/2019 | Cella | H04L 1/0002 |
| 2019/0068618 | A1 * | 2/2019 | Mestha | H04L 63/1416 |

* cited by examiner

*Primary Examiner* — Shawnchoy Rahman
(74) *Attorney, Agent, or Firm* — Buckley Maschoff & Talwalkar LLC

(57) ABSTRACT

According to some embodiments, a plurality of monitoring nodes may each generate a series of current monitoring node values over time that represent a current operation of the industrial asset. A node classifier computer, coupled to the plurality of monitoring nodes, may receive the series of current monitoring node values and generate a set of current feature vectors. The node classifier computer may also access at least one multi-class classifier model having at least one decision boundary. The at least one multi-class classifier model may be executed and the system may transmit a classification result based on the set of current feature vectors and the at least one decision boundary. The classification result may indicate, for example, whether a monitoring node status is normal, attacked, or faulty.

20 Claims, 19 Drawing Sheets

| INDUSTRIAL ASSET IDENTIFIER 1602 | INDUSTRIAL ASSET DESCRIPTION 1604 | GLOBAL CLASSIFIER 1606 | LOCAL CLASSIFIER 1608 | FAULT CLASSIFIER 1610 | STATUS 1612 |
|---|---|---|---|---|---|
| IA_2001 | GAS TURBINE | NONE | 3-CLASS | MULTI-CLASS | TRAINED |
| IA_2002 | WIND TURBINE | NONE | MULTI-CLASS | NONE | TRAINED |
| IA_2003 | AIRCRAFT ENGINE | BINARY | BINARY | MULTI-CLASS | PENDING |
| IA_2004 | ELECTRIC POWER GRID | MULTI-CLASS | MULTI-CLASS | NONE | TRAINED |

|   | \# | N | A | F |
|---|---|---|---|---|
| ACTUAL CLASS | N | 594 | 27 | 0 |
|  | A | 15 | 896 | 1 |
|  | F | 0 | 0 | 24 |

PREDICTED CLASS — 1710

|   | % | N | A | F |
|---|---|---|---|---|
| ACTUAL CLASS | N | 95.7 | 4.4 | 0 |
|  | A | 1.64 | 98.3 | 0.1 |
|  | F | 0 | 0 | 100 |

PREDICTED CLASS — 1720

MULTI-CLASS DECISION SYSTEM FOR CATEGORIZING INDUSTRIAL ASSET ATTACK AND FAULT TYPES

This invention was made with Government support under contract number DEOE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect an industrial asset from cyber-attacks in an automatic and accurate manner even when attacks percolate through the IT and OT layers and directly harm control systems.

SUMMARY

According to some embodiments, a system to protect an industrial asset from cyber-attacks may include monitoring nodes (also referred to as "threat points"). Monitoring nodes might be signals from critical sensors, controller nodes, actuators, and/or key software nodes to be used to monitor occurrences of cyber-threats or abnormal events. A normal space data source may store data, for each of a plurality of monitoring nodes (e.g., sensor nodes, actuator nodes, controller nodes, software nodes, etc.), a series of normal values (also referred to as a "data stream") from monitoring nodes that represent normal operation of an industrial asset. Similarly, an attacked space data source may store a series of attacked values from monitoring nodes and fault data source may store a series of fault values from monitoring nodes. Note that attacked and fault values may be regarded as "abnormal" space data. Normally, control systems do not operate in the abnormal space, since such operation might result in damage, cause a total shutdown, and/or produce catastrophic damage or slow degradation of plant components. A model creation computer may generate sets of normal, attack, and fault feature vectors using values from monitoring nodes. Features might comprise individual quantities extracted from one or more measured data streams. The computer may also calculate and output a decision boundary for a multi-class classifier model based on the normal, attacked, and/or fault feature vectors. The monitoring nodes may then generate a series of current values that represent a current operation of the asset control system. A node classifier computer may receive the series of current values from monitoring nodes, generate a set of current feature vectors from these values, execute the multi-class classifier model, and transmit a classification result based on the current feature vectors and decision boundary.

Some embodiments comprise: means for receiving, from a normal space data source for each of a plurality of monitoring nodes, a series of normal monitoring node values over time that represent normal operation of the industrial asset; means for receiving, from an attacked space data source for each of the plurality of monitoring nodes, a series of attacked monitoring node values over time that represent attacked operation of the industrial asset; means for receiving, from a fault space data source for each of the plurality of monitoring nodes, a series of fault monitoring node values over time that represent fault operation of the industrial asset; and means for automatically calculating and outputting, by a multi-class classifier model creation computer, at least one decision boundary for a multi-class classifier model based on the set of normal feature vectors, the set of attacked feature vectors, and the set of fault feature vectors.

Other embodiments comprise: means for receiving, from the plurality of monitoring nodes, a series of current monitoring node values over time that represent a current operation of the industrial asset; means for generating, by a node classifier computer, a set of current feature vectors; means for accessing at least one multi-class classifier model having at least one decision boundary; and means for executing at least one multi-class classifier model and transmitting a classification result based on the set of current feature vectors and at least one decision boundary, wherein the classification result indicates whether a monitoring node status is normal, attacked, or fault.

Some technical advantages of some embodiments disclosed herein are improved systems and methods to protect an industrial asset from cyber attacks in an automatic and accurate manner.

BRIEF DESCRIPTION OF THE DRAWINGS

FIG. 16 is a tabular portion of a configuration database.

FIG. 17 are classification results according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
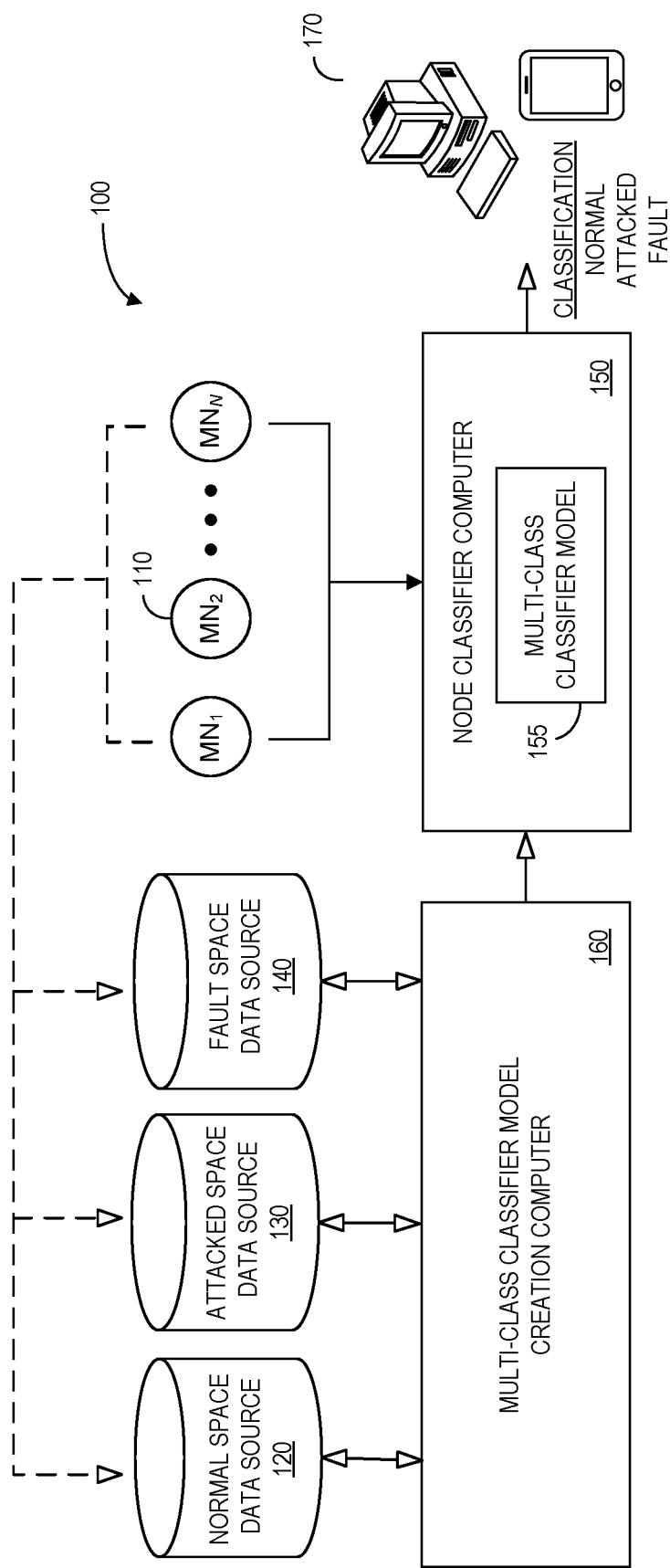
FIG. 1 is a high-level block diagram of a system that may be provided in accordance with some embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. FIG. 1 is a high-level architecture of a system 100 in accordance with some embodiments. The system 100 may include a "normal space" data source 120, an "attacked space" data source 130, and a "fault space" data source 140. The normal space data source 120 might store, for each of a plurality of monitoring nodes 110, a series of normal values over time that represent normal operation of an industrial asset (e.g., generated by a model or collected from actual monitoring node 130 data as illustrated by the dashed line in FIG. 1). The attacked space data source 120 might store, for each of the monitoring nodes 110, a series of attacked values that represent attacked operation of the industrial asset (e.g., when the system is experiencing a cyber-attack). The fault space data source 140 might store, for each of the monitoring nodes 110, a series of fault values that represent operation of the industrial asset when a fault or failure has occurred (e.g., a component becomes broken).

Information from the normal space data source 120, the attacked space data source 130, and the fault space data source 140 may be provided to a multi-class classifier model creation computer 160 that uses this data to create a decision boundary (that is, a boundary that separates normal behavior, attacked behavior, and/or fault behavior). The decision boundary may then be used by a node classifier computer 150 executing a multi-class classifier model 155. The multi-class classifier model 155 may, for example, monitor streams of data from the monitoring nodes 110 comprising data from sensor nodes, actuator nodes, and/or any other critical monitoring nodes (e.g., monitoring nodes $MN_1$ through $MN_N$) and automatically output a classification result (e.g., indicating that operation of the industrial asset is normal, attacked, or fault) to one or more remote monitoring devices 170 when appropriate (e.g., for display to a user). As used herein, the term "automatically" may refer to, for example, actions that can be performed with little or no human intervention. According to some embodiments, information about detected attack or fault may be transmitted back to an industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The multi-class classifier model creation computer 160 may store information into and/or retrieve information from various data stores, such as the normal space data source 120, the attacked space data source 130, and/or the fault space data source 140. The various data sources may be locally stored or reside remote from the multi-class classifier model creation computer 160. Although a single multi-class classifier model creation computer 160 is shown in FIG. 1, any number of such devices may be included. Moreover, various devices described herein might be combined according to embodiments of the present invention. For example, in some embodiments, the multi-class classifier model creation computer 160 and one or more data sources 120, 130, 140 might comprise a single apparatus. The multi-class classifier model creation computer 160 and or node classifier computer 150 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack detection trigger levels) and/or provide or receive automatically generated recommendations or results from the multi-class classifier model creation computer 160 and/or the node classifier computer 150.

Figure 2:
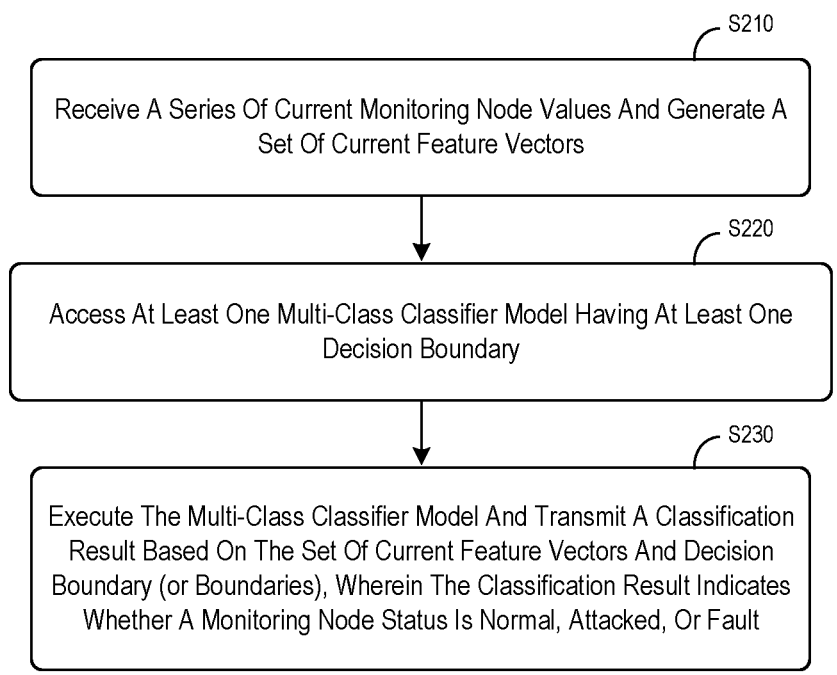
FIG. 2 is an industrial asset protection method according to some embodiments.

The decision boundary associated with the multi-class classifier model can be used to detect cyber-attacks and/or naturally occurring faults. For example, FIG. 2 is an industrial asset protection method according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may receive, from a plurality of monitoring nodes, a series of current values over time that represent a current operation of an industrial asset. The system may also generate, based on the received series of current values, a set of current feature vectors. At S220, a multi-class classifier model may be accessed including at least one decision boundary. At S230, the model may be executed and a classification result may be transmitted based on the set of current feature vectors and the decision boundary when appropriate (e.g., when a cyber-attack or fault is detected). According to some embodiments, one or more response actions may be performed when a classification result is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, etc.

Some embodiments described herein may take advantage of the physics of a control system by learning a priori from tuned high fidelity equipment models and/or actual "on the job" data to detect single or multiple simultaneous adversarial threats to the system as well as to identify faults. Moreover, according to some embodiments, all monitoring node data may be converted to features using advanced feature-based methods, and the real-time operation of the control system may be monitoring in substantially real-time. Abnormalities may be detected by classifying the monitored data as being "normal", "attacked", or "fault". This decision boundary may be constructed in feature space using dynamic models and may help enable early detection of vulnerabilities (and potentially avert catastrophic failures) allowing an operator to restore the control system to normal operation in a timely fashion.

Figure 3A:
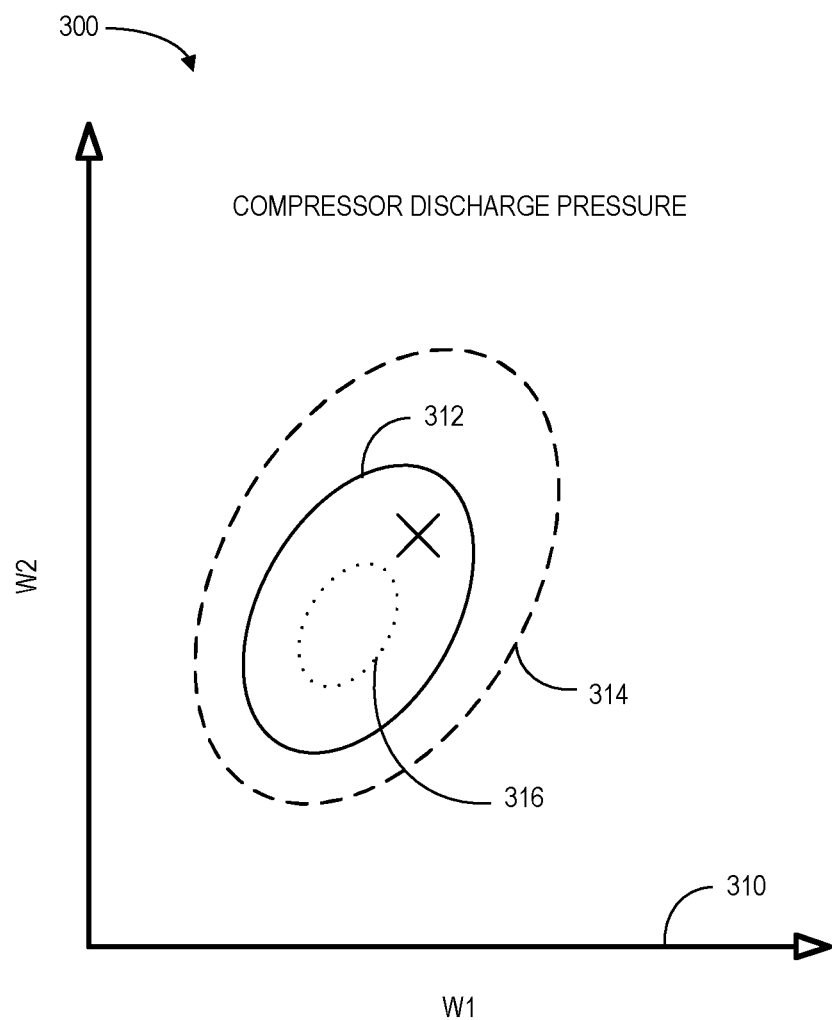
FIGS. 3A and 3B illustrate features, feature vectors, and decision boundaries in accordance with some embodiments.
Figure 3B:
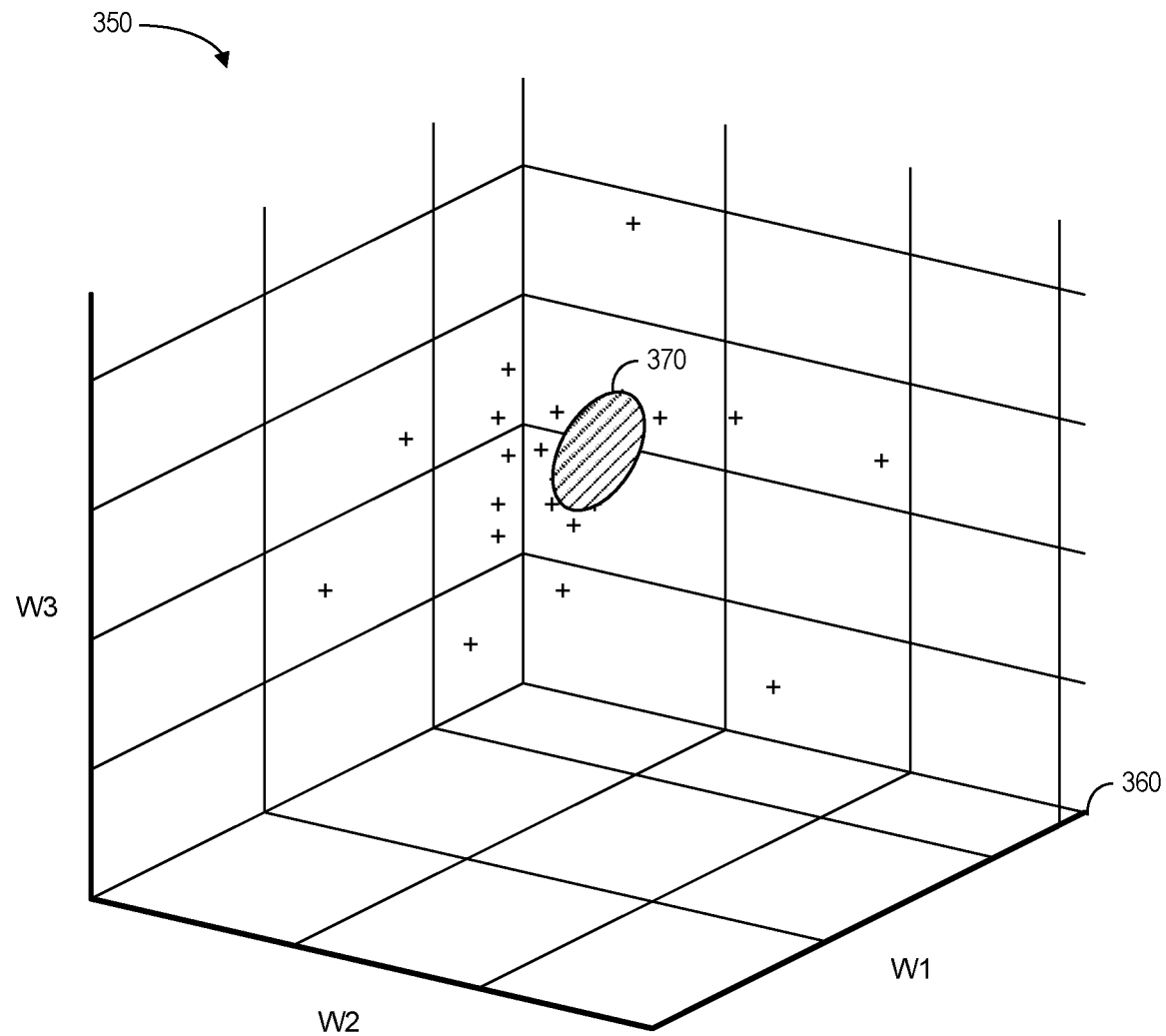

FIGS. 3A and 3B illustrate features, feature vectors, and decision boundaries in accordance with some embodiments. Note that, as used herein, the phrase "decision boundaries" and the term "classifiers" may be used interchangeably and may have the same meaning. In particular, FIG. 3A illustrates 300 boundaries and feature vectors for a monitoring node parameter in accordance with some embodiments. A graph 310 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 310 illustrated in FIG. 3 represents compressor discharge temperature for a gas turbine but other values might be monitored instead (e.g., compressor pressure ratio, compressor inlet temperature, fuel flow, generator power, gas turbine exhaust temperature, etc.). The graph 310 includes an average boundary 312 (solid line), minimum boundary 314 (dotted line), and maximum boundary 316 (dashed line) and an indication associated with current feature location for the monitoring node parameter (illustrated with an "X" on the graph 310). As illustrated in FIG. 3, the current monitoring node location is between the minimum and maximum boundaries (that is, the "X" is between the dotted and dashed lines). As a result, the system may determine that the operation of the industrial asset is normal (and no attack or fault is being detected for that monitoring node).

FIG. 3B illustrates 350 three dimensions of threat node outputs in accordance with some embodiments. In particular, a graph 360 plots monitoring node outputs ("+") in three dimensions, such as dimensions associated with PCA: w1, w2, and w3. Moreover, the graph 360 includes an indication of a normal operating space decision boundary 370. Although a single contiguous boundary 370 is illustrated in FIG. 3B, embodiments might be associated with multiple regions (e.g., associated with attacked and fault regions).

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 4:
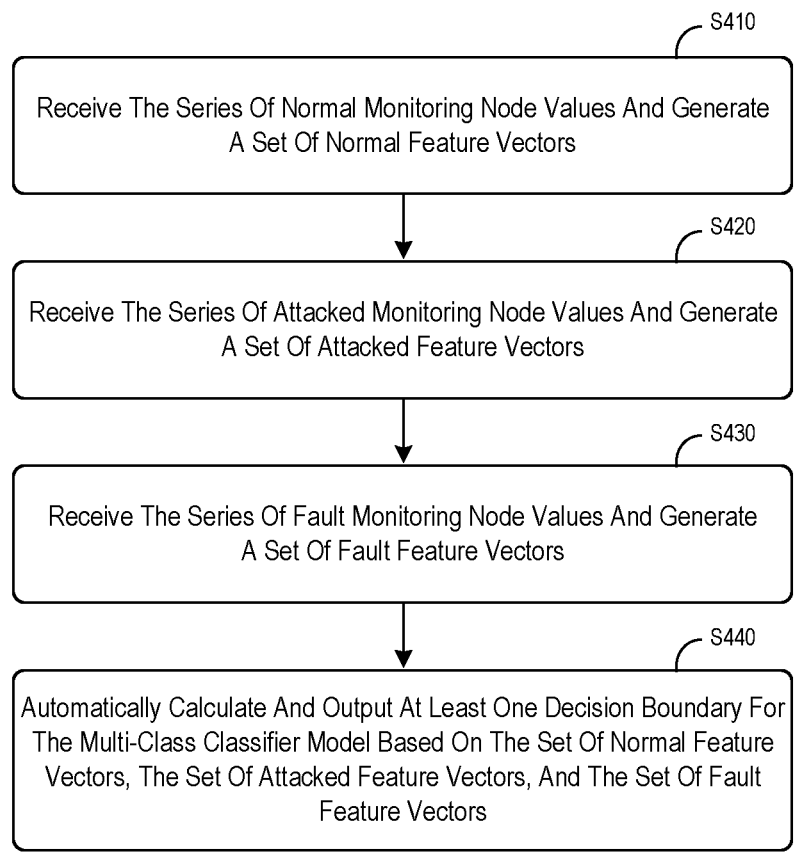
FIG. 4 is a multi-class classifier model creation method according to some embodiments.

FIG. 4 illustrates a model creation method that might be performed by some or all of the elements of the system 100 described with respect to FIG. 1. At S410, the system may retrieve, for each of a plurality of monitoring nodes, a series of normal values over time that represent normal operation of the industrial asset and a set of normal feature vectors may be generated. At S420 the system may retrieve, for each of the plurality of monitoring nodes, a series of attacked values over time that represent attacked operation of the industrial asset and a set of attacked feature vectors may be generated. Similarly, at S430 the system may retrieve, for each of the plurality of monitoring nodes, a series of fault values over time that represent a fault operation of the industrial asset and a set of fault feature vectors may be generated. The series of normal and/or threatened values might be obtained, for example, by running DoE on an industrial control system associated with a power turbine, a jet engine, a locomotive, an autonomous vehicle, etc. At S440, a decision boundary may be automatically calculated and output for a multi-class classifier model based on the sets of normal feature vectors, attacked feature vectors, and fault feature vectors. According to some embodiments, the decision boundary might be associated with a line, a hyperplane, a non-linear boundary separating normal space from attacked or fault space, and/or a plurality of decision boundaries. In addition, note that the multi-class classifier model might be associated with the decision boundary, feature mapping functions, and/or feature parameters.

Thus, embodiments may provide a unified system to classify the status of an industrial control system having a plurality of monitoring nodes (including sensor, actuator, and controller nodes) as being normal, under a cyber-attack, or fault. The system may be configurable and may distinguish between intelligent adversarial attacks and naturally occurring faults in each monitoring node. Furthermore, in case of a naturally occurring fault, some embodiments may determine a specific failure mode for each monitoring node. This may enable tailored, resilient, and fault-tolerant control remedies against cyber-attacks and faults.

Some embodiments consist of a collection of layered multi-class classifiers which together determine the status of each monitoring node as being normal, under attack, or faulty (and, in some cases, may also categorize the type of fault that has occurred). The multi-class decision systems might be arranged in various configurations (e.g., as described in connection with FIGS. 7 through 12) of interconnected classifiers. For a particular application, these configurations may exhibit different performance and computational demands. An appropriate configuration may be selected for an available data set based on required performance and available on-line computational power. Note that this selection might be automatically performed by an algorithm.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technic such as PCA. Note that the features may be calculated over a sliding window of the signal time series and the length of the window (and the duration of slide) may be determined from domain knowledge and inspection of the data or using batch processing.

According to some embodiments, information about threats, spoofing, attack vectors, vulnerabilities, faults, etc. may be provided to models and/or a training and evaluation database created using DoE techniques. The models may, for example, simulate data from monitoring nodes to be used to compute features that are assembled into a feature vector to be stored in the training and evaluation database. The data in the training and evaluation database may then be used to compute decision boundaries to distinguish between normal operation, attacked operation, and fault operation. According to some embodiments, the models may comprise high fidelity models that can be used to create a data set (e.g., a set that describes attacked and/or fault space). The data from the monitoring nodes might be, for example, quantities that are captured for a length of from 30 to 50 seconds from sensor nodes, actuator nodes, and/or controller nodes (and a similar data set may be obtained for "levels of normal operating conditions in the system versus quantities from the monitoring nodes"). Since attacks might be multi-prong (e.g., multiple attacks or faults might happen at once), DoE experiments may be designed to capture the attack and fault space (e.g., using full factorial, Taguchi screening, central composite, and/or Box-Behnken). When models are not available, these DoE methods can also be used to collect data from real-world asset control system. Experiments may run, for example, using different combinations of simultaneous attacks and faults. Similar experiments may be run to create a data set for the normal operating space.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_i \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time threat detection, decisions may be made by comparing where each point falls with respect to a decision boundary that separates the space between two regions (or spaces): abnormal ("attack" or "fault") space and normal operating space. If the point falls in the abnormal space, the industrial asset is undergoing an abnormal operation such as during a cyber-attack. If the point falls in the normal operating space, the industrial asset is not undergoing an abnormal operation such as during a cyber-attack. Appropriate decision zone with boundaries are constructed using data sets as described herein with high fidelity models. For example, support vector machines may be used with a kernel function to construct a decision boundary. According to some embodiments, deep learning techniques may also be used to construct decision boundaries.

Figure 5:
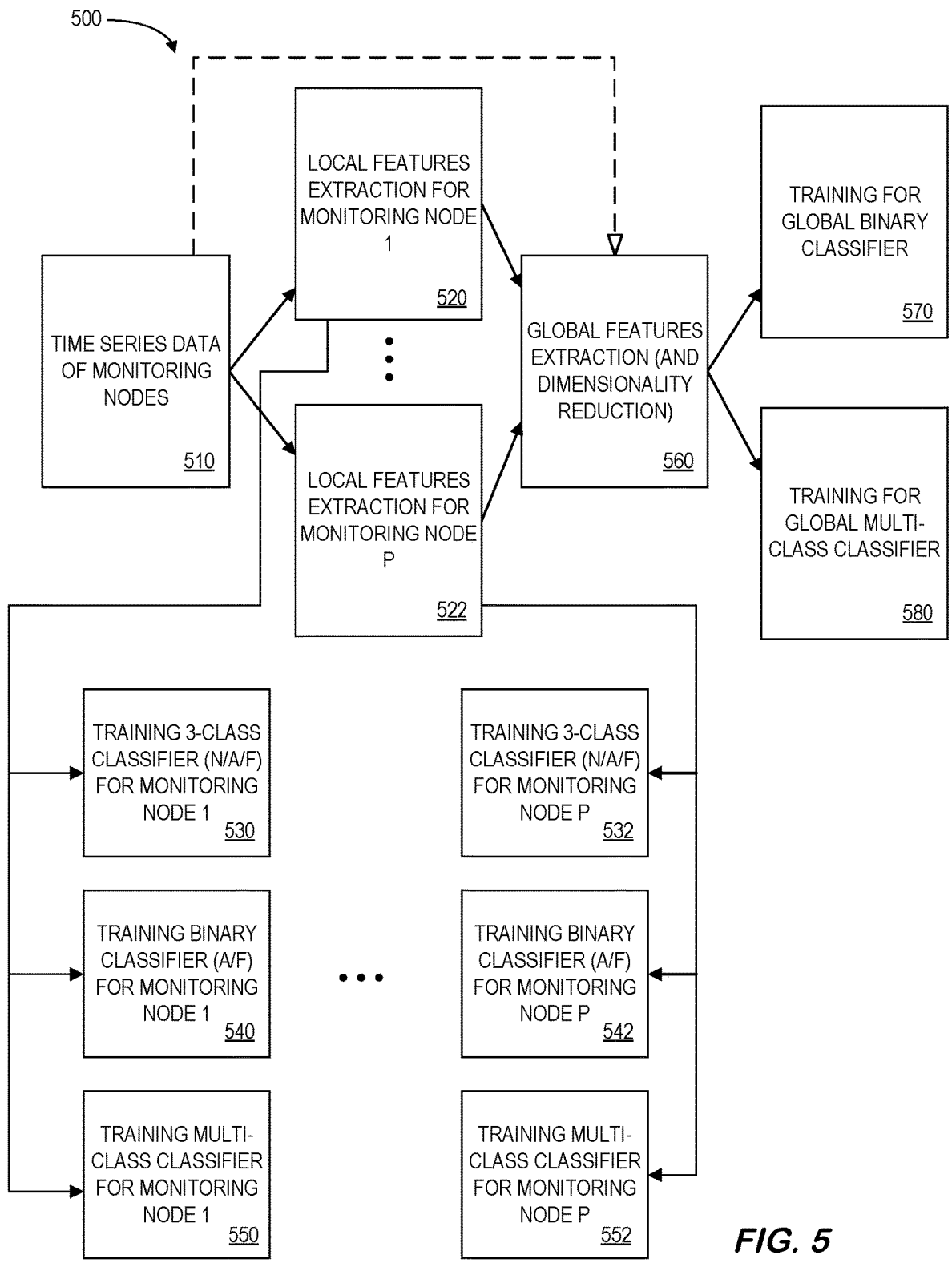
FIG. 5 illustrates an off-line training process in accordance with some embodiments.

FIG. 5 illustrates an off-line training process 500 in accordance with some embodiments. At 510, time series data of P monitoring nodes are received and local features are extracted for each of the monitoring nodes at 520, 522. The local features are provided to: (i) train a 3-class classifier (normal ("N"), attacked ("A"), and fault ("F")) for monitoring node 1 at 530; (ii) train a binary classifier (A/F) for monitoring node 1 at 540, and (iii) train a multi-class classifier for monitoring node 1 at 550. The process is repeated to train classifiers for all P monitoring nodes at 532, 542, 552. Note that fewer than all of the classifiers might be trained depending on the industrial asset protection configuration that is being implemented (and the determination of which classifiers to train might be an automatic process).

Note that during the training phase, normal, attack, and fault data sets may be generated and their corresponding features may be extracted. The normal data may be collected during different operational modes of the asset and different ambient conditions. The attack data set may comprise different attack types of different severity, and the fault data set may consist of data associated with different failure modes of each monitoring node. The data sets may be generated using physics-based or data-driven models, or collected from the field.

According to some embodiments, the local features are provided to a global features extraction process (and dimensionality reduction) at 560. The results of this process can then be provided to train a global binary classifier 570 and/or a global multi-class classifier 580. That is, the local features may be extracted for each monitoring node from their corresponding time-series data to for the local feature vectors. Then local feature vectors may then be stacked to create the global feature vector. The global feature vector may also contain, according to some embodiments, interactive features for two or multiple node for which the time-series data is used again (as illustrated by the dashed arrow in FIG. 5). The dimension of the global feature vector may be reduced to increase computational efficiency. Repeating this process for all the time series in the data set, results in a set of local and global feature vectors. The global feature vector may then be used to train a global binary classifier (making the global decision of "normal" vs. "abnormal" system status) and/or a global multi-class classifier. The binary classifiers can be trained using binary classification methods such as Support Vector Machines ("SVM"), Extreme Learning Machine ("ELM") neural network, deep neural networks, etc. The multiclass classifiers of three classes or more, can be trained using multi-class classification methods such as kernel-ELM (ELM with a nonlinear kernel, such as a Gaussian or wavelet kernel), decision trees, and multi-class SVM. The decision boundaries computed for each classifier may be stored to be used during the real-time operation.

Figure 6:
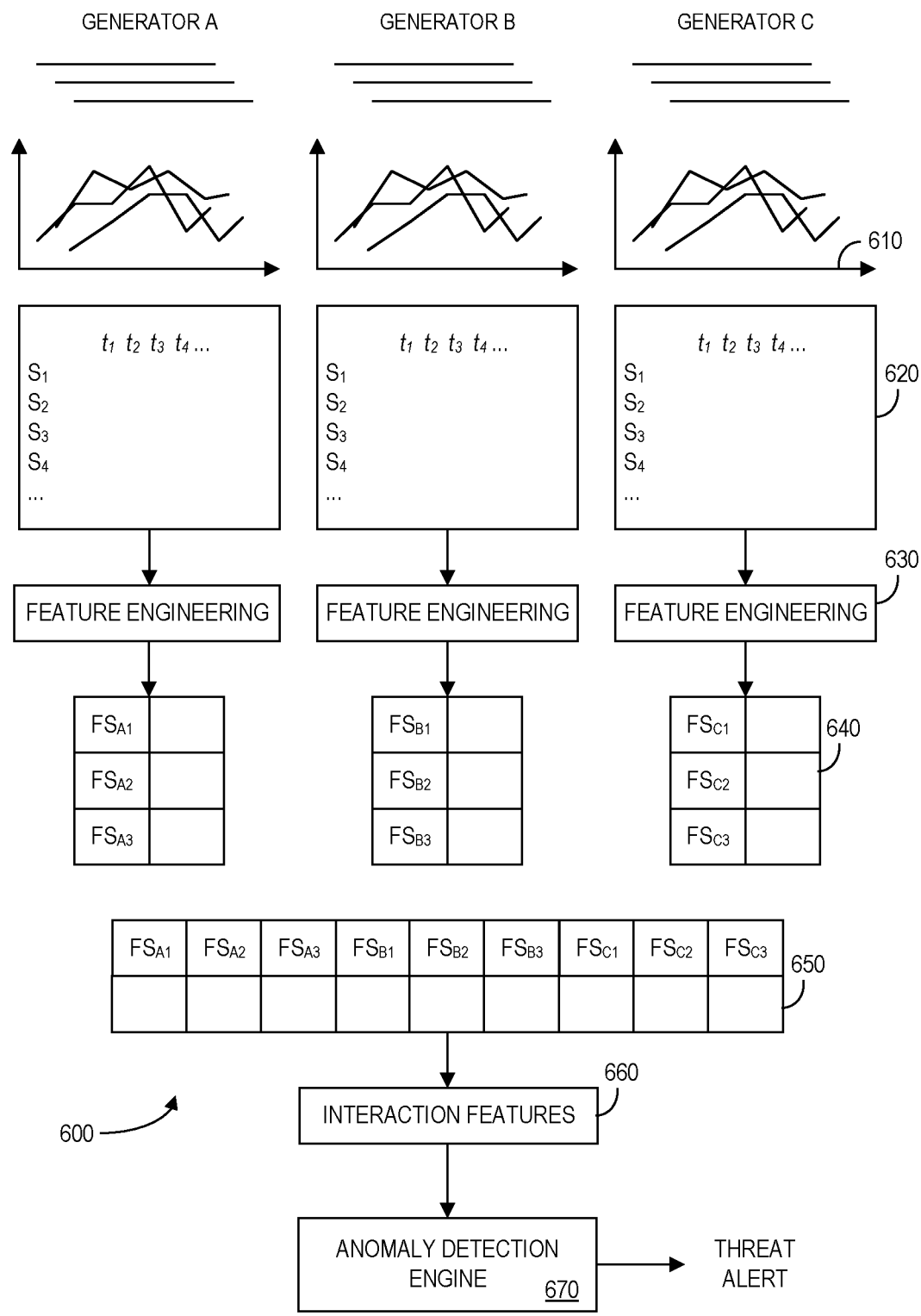
FIG. 6 illustrates global features according to some embodiments.

FIG. 6 is an example of a global threat protection system 600 in accordance with some embodiments. In particular, system includes three generators (A, B, and C) and batches of values 610 from monitoring nodes are collected for each generated over a period of time (e.g., 30 to 50 seconds). According to some embodiments, the batches of values 610 from monitoring nodes overlap in time. The values 610 from monitoring nodes may, for example, be stored in a matrix 620 arranged by time ($t_1$, $t_2$, etc.) and by type of monitoring node ($S_1$, $S_2$, etc.). Feature engineering components 630 may use information in each matrix 620 to create a feature vector 640 for each of the three generators (e.g., the feature vector 640 for generator C might include $FS_{C1}$, $FS_{C2}$, etc.). The three feature vectors 640 may then be combined into a single global feature vector 650 for the system 600. Interaction features 660 may be applied (e.g., associated with A*B*C, A+B+C, etc.) and an anomaly detection engine 670 may compare the result with a decision boundary and output a classification result when appropriate.

Figure 7:
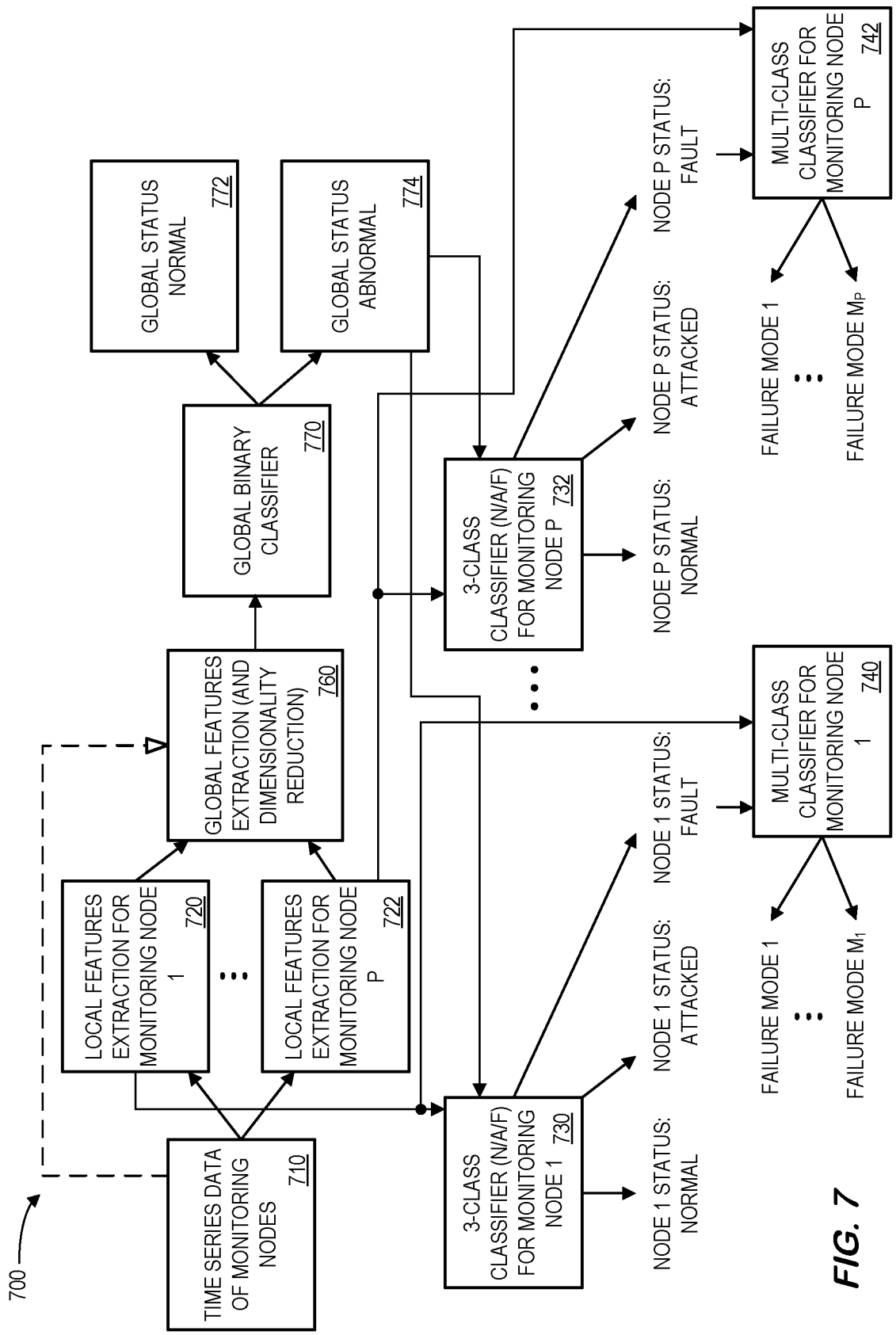
FIGS. 7 through 12 illustrate online node classification configurations in accordance with some embodiments.

After the appropriate local and global classifiers have been trained, they can be used in real-time to monitor an industrial asset. Note that many different configurations of classifiers could be implemented. In particular, FIGS. 7 through 12 will describe several specific implementations but embodiments could be configured in any number of other different ways. FIG. 7 illustrates an online node classification configuration 700 in accordance with some embodiments. In this configuration 700, time series data of monitoring nodes 710 is used to extract local features for each of P nodes 720, 722 as well as to extract global features (at which point dimensionality reduction may be performed) 760. The global features may be provided to a global binary classifier 770. If the global binary classifier 770 indicates that the global status is normal 772, the process may end (e.g., that is, since everything seems to be operating properly there may be no need to evaluate each individual node).

If the global binary classifier 770, however, indicates that the global status is abnormal 774 (that is, an attack or fault might exist at various nodes), a 3-class classifier (N/A/F) 730, 732 may be executed using the local features for each node. The 3-class classifier 730, 732 will indicate whether a particular node is normal, attacked, or fault. In the case of fault, a multi-class classifier 740, 742 may be executed for each node (using the local features) to determine a particular failure mode (e.g., mode 1 through M). Note that in this configuration 700, the number of classes for the multi-class classifier 740, 742 equals the number of different failure modes for that particular node. So, if there are P monitoring nodes, each having $M_i$ (i=1, . . . , P) failure modes, the configuration will have P 3-class classifiers 730, 732 and P multi-class classifiers 740, 742, each having $M_i$ classes, in addition to one global binary classifier 770. Overall, this configuration 770 is a three-layer decision making system and the classification decision is made in a hierarchical manner.

Figure 8:
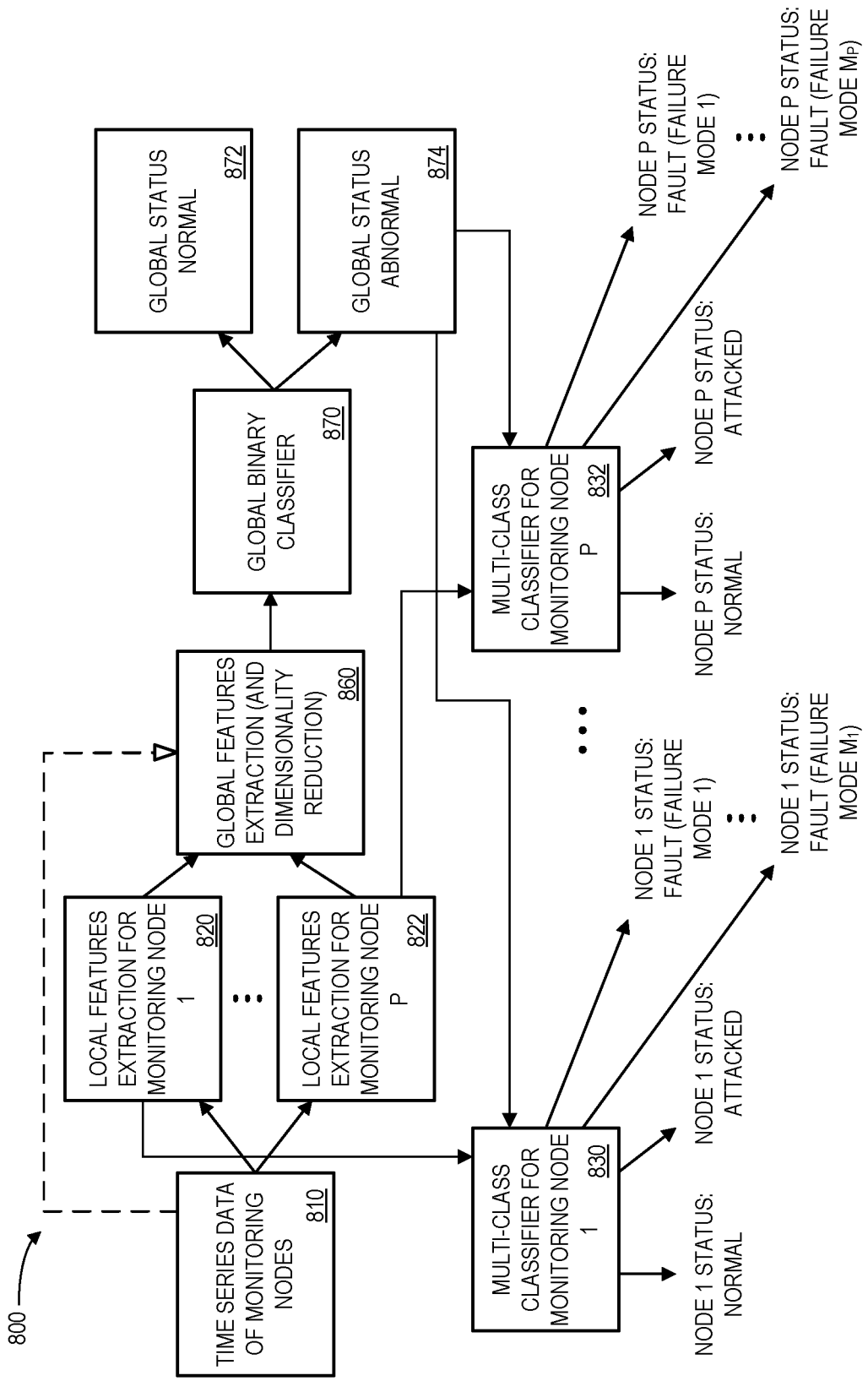

FIG. 8 illustrates an online node classification configuration 800 in accordance with some embodiments. As before, time series data of monitoring nodes 810 is used to extract local features for each of P nodes 820, 822 as well as to extract global features (at which point dimensionality reduction may be performed) 860. The global features may be provided to a global binary classifier 870. If the global binary classifier 870 indicates that the global status is normal 872, the process may end (e.g., that is, since everything seems to be operating properly there may be no need to evaluate each individual node).

If the global binary classifier 870, however, indicates that the global status is abnormal 874 (that is, an attack or fault might exist at various nodes), a multi-class classifier 830, 832 may be executed using the local features for each node. The multi-class classifier 830, 832 will indicate whether a particular node is normal, attacked, or in one of a pre-determined number of failure modes. This configuration 800 has a single global binary classifier 870, and P (number of nodes) multi-class classifiers 830, 832 (each having $M_i+2$ classes). Compared to the configuration 700 of FIG. 7, this configuration 800 has a simplified structure but higher complexity in the classifiers at the second layer.

Figure 9:
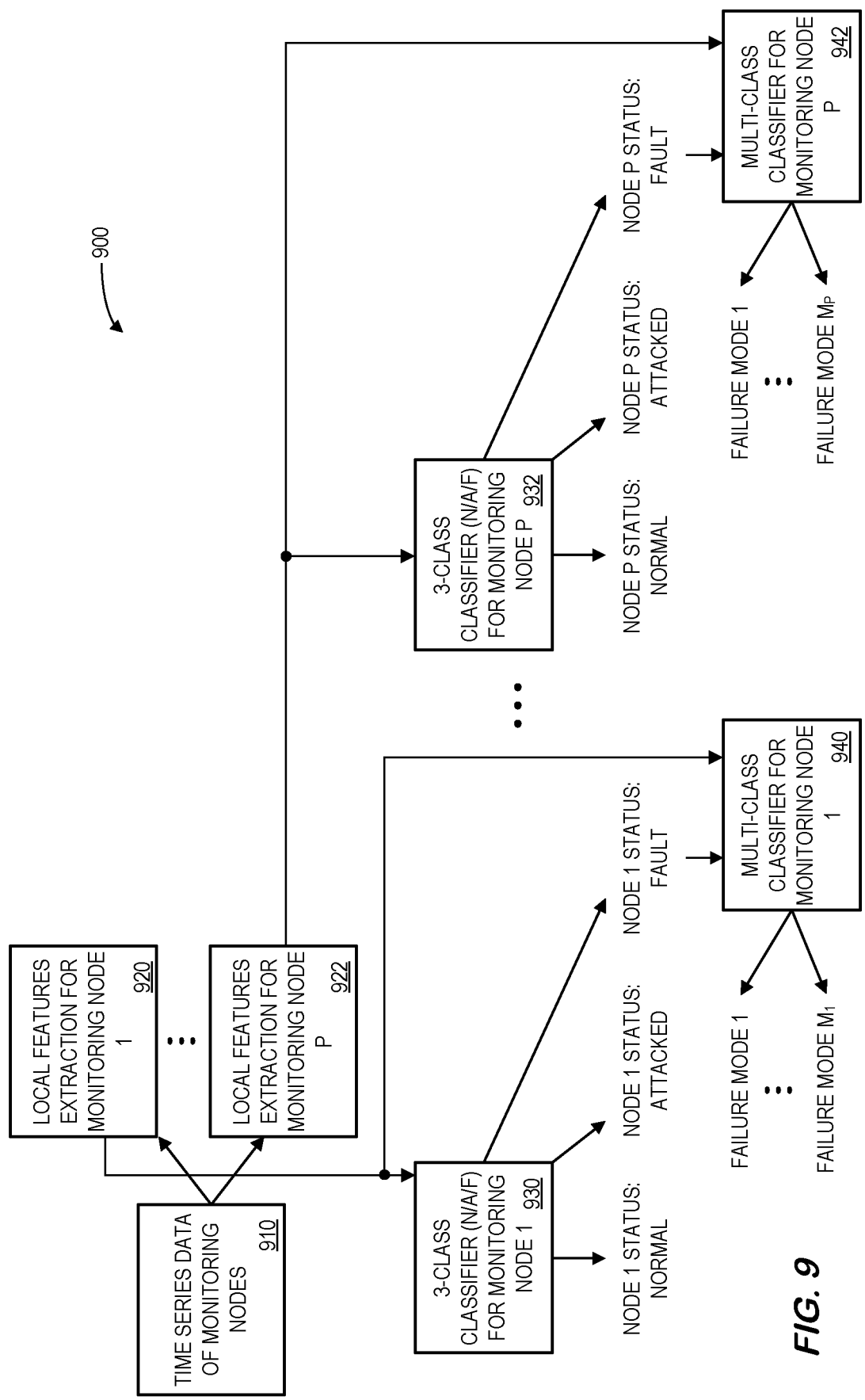

FIG. 9 illustrates an online node classification configuration 900 in accordance with some embodiments. In this configuration 900, time series data of monitoring nodes 910 is used to extract local features for each of P nodes 920, 922. A 3-class classifier (N/A/F) 930, 932 is then executed using the local features for each node. The 3-class classifier 930, 932 will indicate whether a particular node is normal, attacked, or fault. In the case of fault, a multi-class classifier 940, 942 may be executed for each node (using the local features) to determine a particular failure mode (e.g., mode 1 through M). In this configuration 900, the local decision is directly made without using any prior global decision. This simplifies the decision process and the training phase but needs more real-time computations. Note that in configurations 700, 800 only a subset of classifiers is active at each instant. For example, in configuration 700, as long as the global system status is normal, all classifiers at the second and third layers are dormant (saving a lot of real-time computations). However, in this configuration 900 all classifiers at the first layer must remain active all the time. On the other hand, using this configuration 900 the global status is inferred as a readily available by-product (without any additional computations or training). As seen in the FIG. 9, this is a two-layer configuration with P 3-class classifiers 930, 932 at the first layer and P multi-class (failure modes) classifiers 940, 942 at the second layer.

Figure 10:
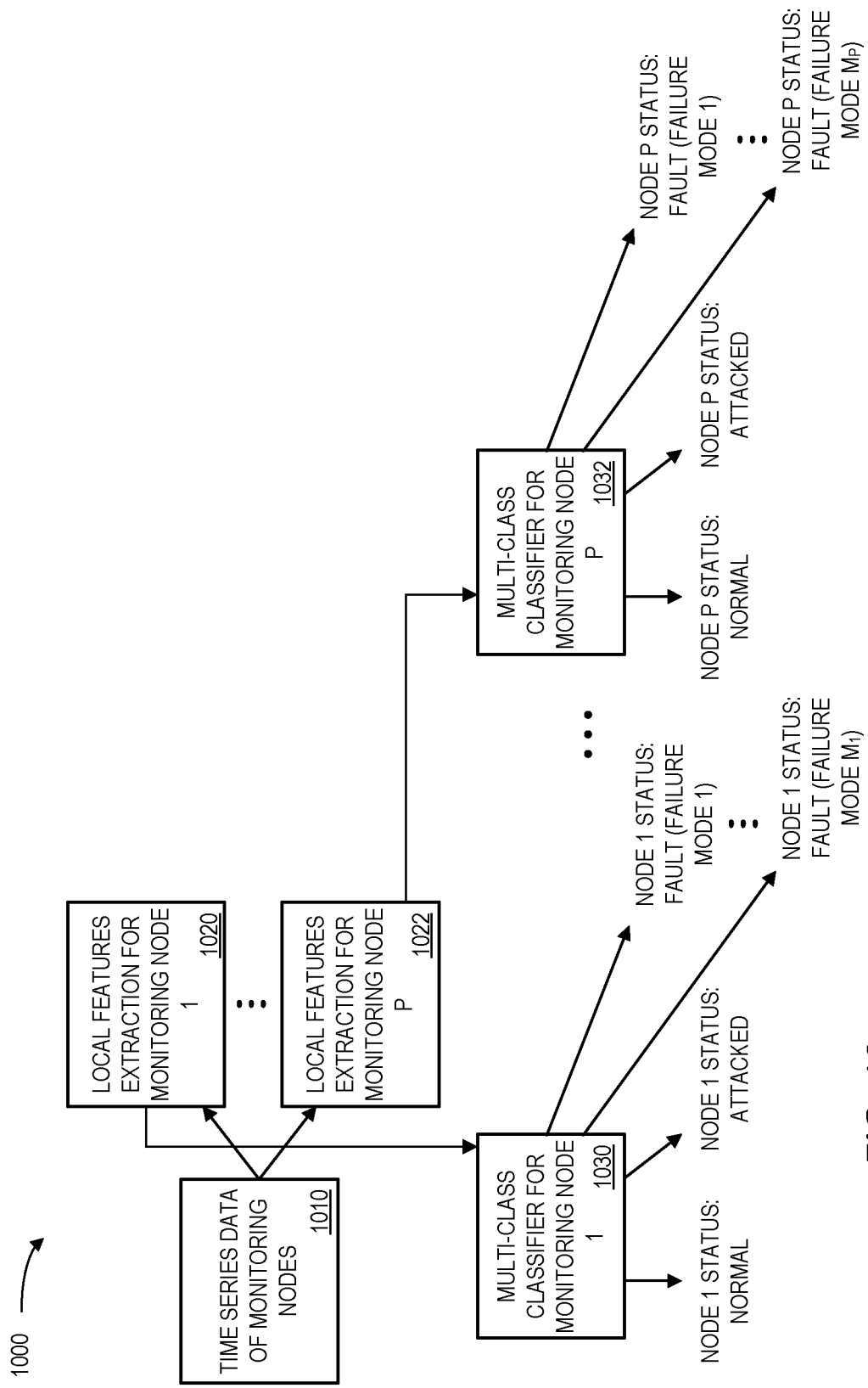

FIG. 10 illustrates an online node classification configuration 1000 in accordance with some embodiments. In this configuration 1000, time series data of monitoring nodes 1010 is used to extract local features for each of P nodes 1020, 1022. A multi-class classifier 1030, 1032 is then executed using the local features for each node. The multi-class classifier 1030, 1032 will indicate whether a particular node is normal, attacked, or in a particular failure mode (e.g., mode 1 through M). This is the simplest configuration 1000 in terms of the decision process but the most complex in terms of training the classifiers. As seen in FIG. 10, this is single-layer configuration comprising of P multi-class classifiers 1030, 1032 (each having $M_i+2$ classes). Like configuration 900, all classifiers must always remain active.

Figure 11:
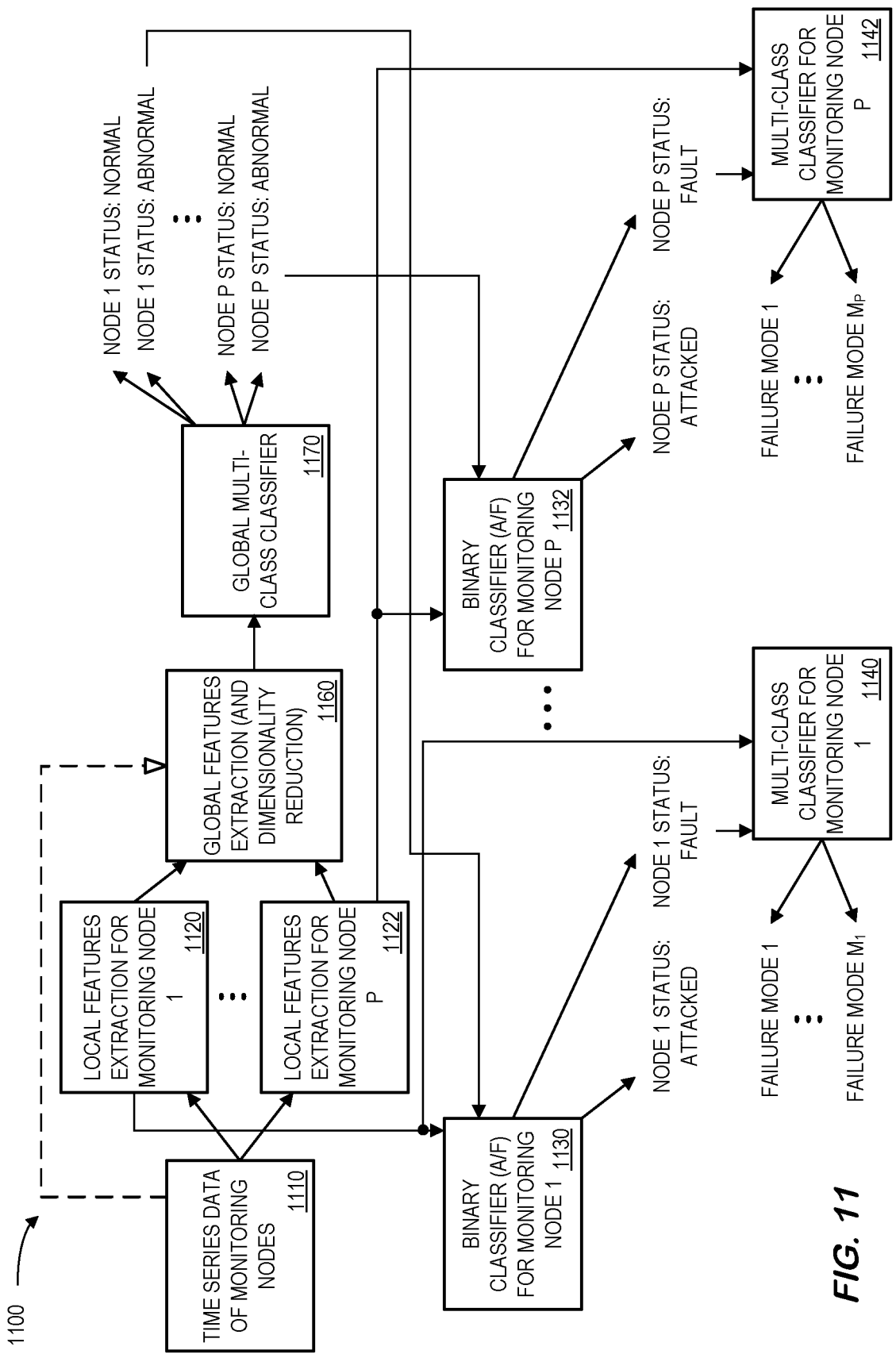

FIG. 11 illustrates an online node classification configuration 1100 in accordance with some embodiments. In this configuration 1100, time series data of monitoring nodes 1110 is used to extract local features for each of P nodes 1120, 1122 as well as to extract global features (at which point dimensionality reduction may be performed) 1160. The global features may be provided to a global multi-class classifier 1170 which indicates whether each individual node is "normal" or "abnormal".

If the global multi-class classifier 1170 indicates that particular node is abnormal (that is, an attack or fault might exist at the node), a binary classifier (A/F) 1130, 1132 may be executed using the local features for each node. The binary class classifier 1130, 1132 will indicate whether a particular node is attacked or fault (based on the global features, the system already knows the node is not "normal"). In the case of fault, a multi-class classifier 1140, 1142 may be executed for each node (using the local features) to determine a particular failure mode (e.g., mode 1 through M). In this configuration 1100, again both local and global features are used. The global feature vector is fed into a large global multi-class classifier 1170 which determines the binary status of all monitoring nodes as being normal or abnormal. This classifier has 2*P classes. At the second layer, the local features of the nodes whose status is abnormal are passed into binary classifiers 1130, 1132 categorizing the abnormalities as attack vs. fault. Finally, if the node status is fault, at the last layer, the failure mode is determined. This is a three-layer decision system with a single global multi-class classifier 1170 (2*P classes) at the first layer, P binary classifiers (attack/fault) at the second layer and P multi-class classifiers (failure modes) at the third layer.

Figure 12:
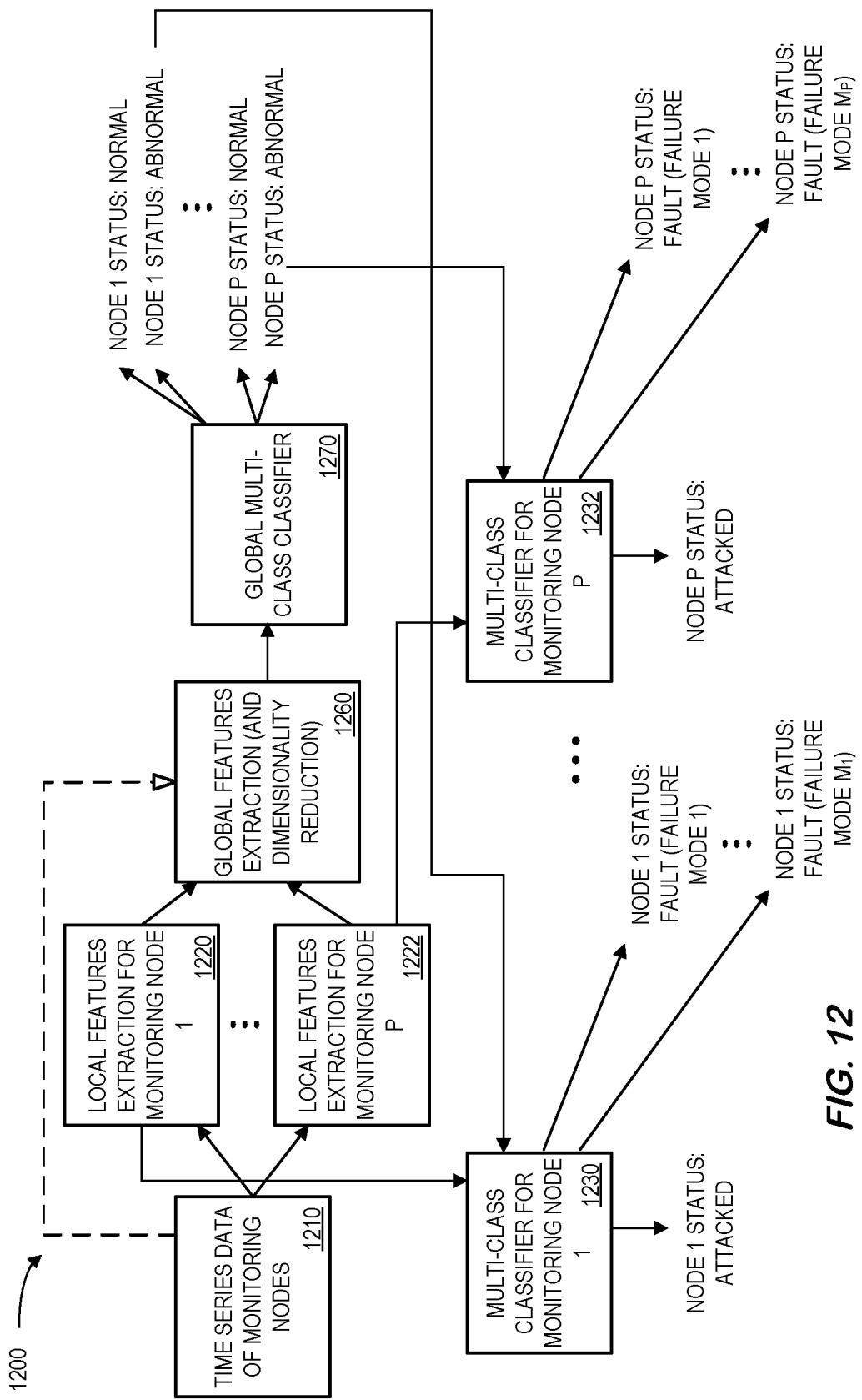

FIG. 12 illustrates an online node classification configuration 1200 in accordance with some embodiments. In this configuration 1200, time series data of monitoring nodes 1210 is used to extract local features for each of P nodes 1220, 1222 as well as to extract global features (at which point dimensionality reduction may be performed) 1260. The global features may be provided to a global multi-class classifier 1270 which indicates whether each individual node is "normal" or "abnormal".

If the global multi-class classifier 1270 indicates that particular node is abnormal (that is, an attack or fault might exist at the node), a multi-class classifier 1230, 1232 may be executed using the local features for each node. The multi-class class classifier 1230, 1232 will indicate whether a particular node is normal, attacked, in a pre-determined number of failure modes (based on the global features, the system already knows the node is not "normal"). This configuration is 1200 similar to configuration 1100 except that here the second and third layers are combined into one layer, making it a two-layer configuration. The first layer has the same global multi-class classifier 1270 as in configuration 1100 and the second layer comprises of P multi-class classifiers each having $M_i+2$ classes as in configuration 1000.

Figure 13:
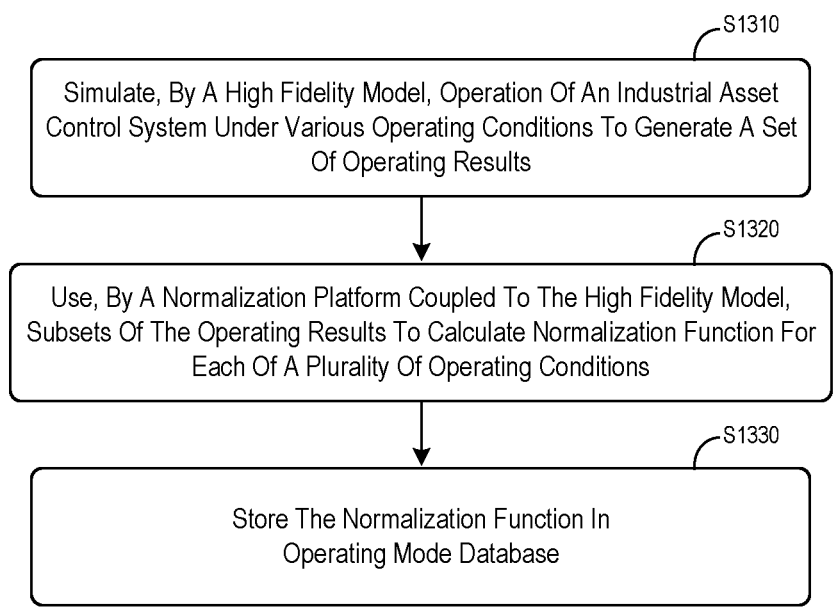
FIG. 13 is an off-line, non-real time, method according to some embodiments.

FIG. 13 is an off-line, non-real time, method according to some embodiments. At S1310, a high fidelity model may simulate operation of an industrial asset under various operating conditions to generate a set of operating results. According to some embodiments, the system may monitor the operation of the industrial asset (e.g., instead of simulation operation). At S1320, a normalization platform coupled to the high fidelity model may use subsets of the operating results to calculate a normalization function (e.g., associated with normalized signals) for each of a plurality of operating conditions. An operating mode database may then be used to store the normalization function and/or normalized signals at S1330.

Figure 14:
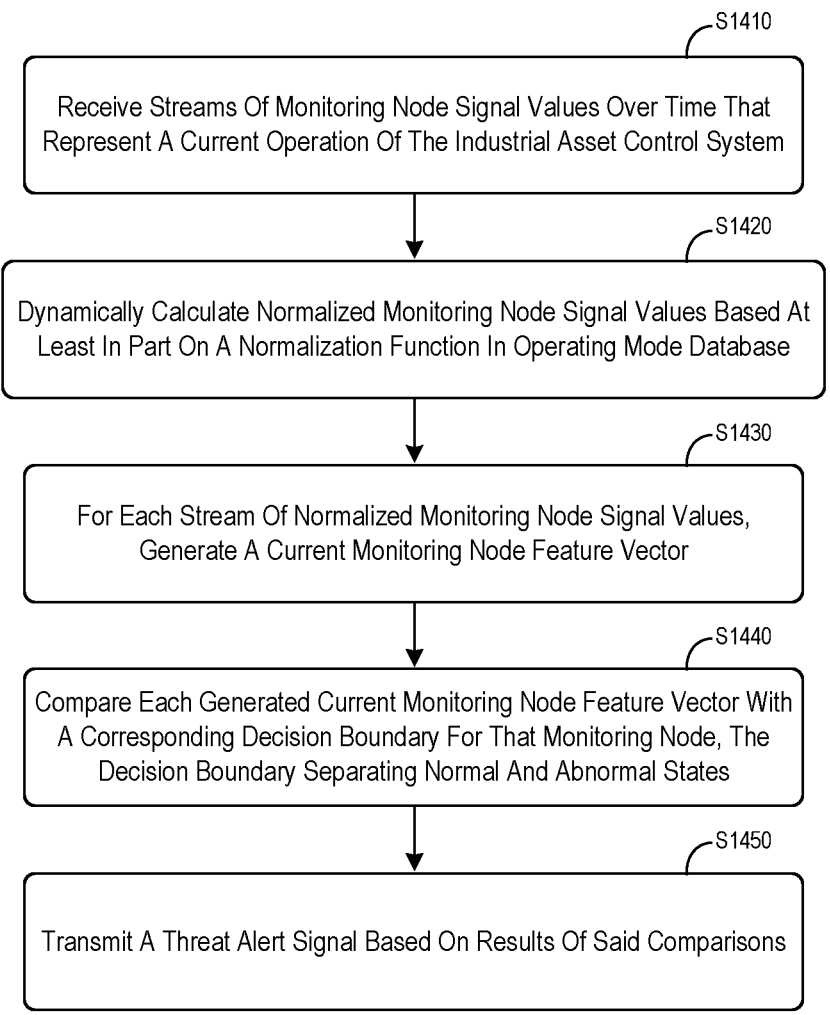
FIG. 14 is a real-time, dynamic method in accordance with some embodiments.

FIG. 14 is a real-time, dynamic method in accordance with some embodiments. At S1410, a plurality of real-time monitoring node signal inputs may receive streams of monitoring node signal values over time that represent a current operation of the industrial asset. At S1420, a threat detection computer platform, coupled to the plurality of real-time monitoring node signal inputs and the operating mode database, may receive the streams of monitoring node signal values and dynamically calculate normalized monitoring node signal values based at least in part on a normalization function in the operating mode database. For each stream of normalized monitoring node signal values, the system may generate a current monitoring node feature vector at S1430. Note that the current monitoring node feature vectors may be associated with dynamic temporal normalization and/or dynamic spatial normalization.

At S1440, the system may compare each generated current monitoring node feature vector with a corresponding decision boundary for that monitoring node (the decision boundary separating normal state, attacked state, and fault state for that monitoring node). At S1450, the system may automatically transmit a threat alert signal based on results of said comparisons. The alert signal might be transmitted, for example, via a cloud-based application. According to some embodiments, the alert signal may be transmitted via one or more of a cloud-based system, an edge-based system, a wireless system, a wired system, a secured network, and a communication system.

By way of example only, the industrial asset might be associated with a gas turbine. In this case, the operating conditions might be associated with gas turbine loads and/or gas turbine temperatures. Other gas turbine parameters might include: (i) an operating mode, (ii) an external condition, (iii) a system degradation factor, (iv) fuel input, (v) a turbine inlet temperature, (vi) a turbine inlet pressure, (vii) a turbine power, (viii) a turbine speed, (ix) compressor discharge pressure, (x) compressor discharge temperature, (xi) fuel flow, and/or (xii) turbine exhaust temperature. As another example, the industrial asset might be associated with a computer network and the operating conditions may be associated with information packet transmission characteristics (e.g., packet size, latency, etc.).

Figure 15:
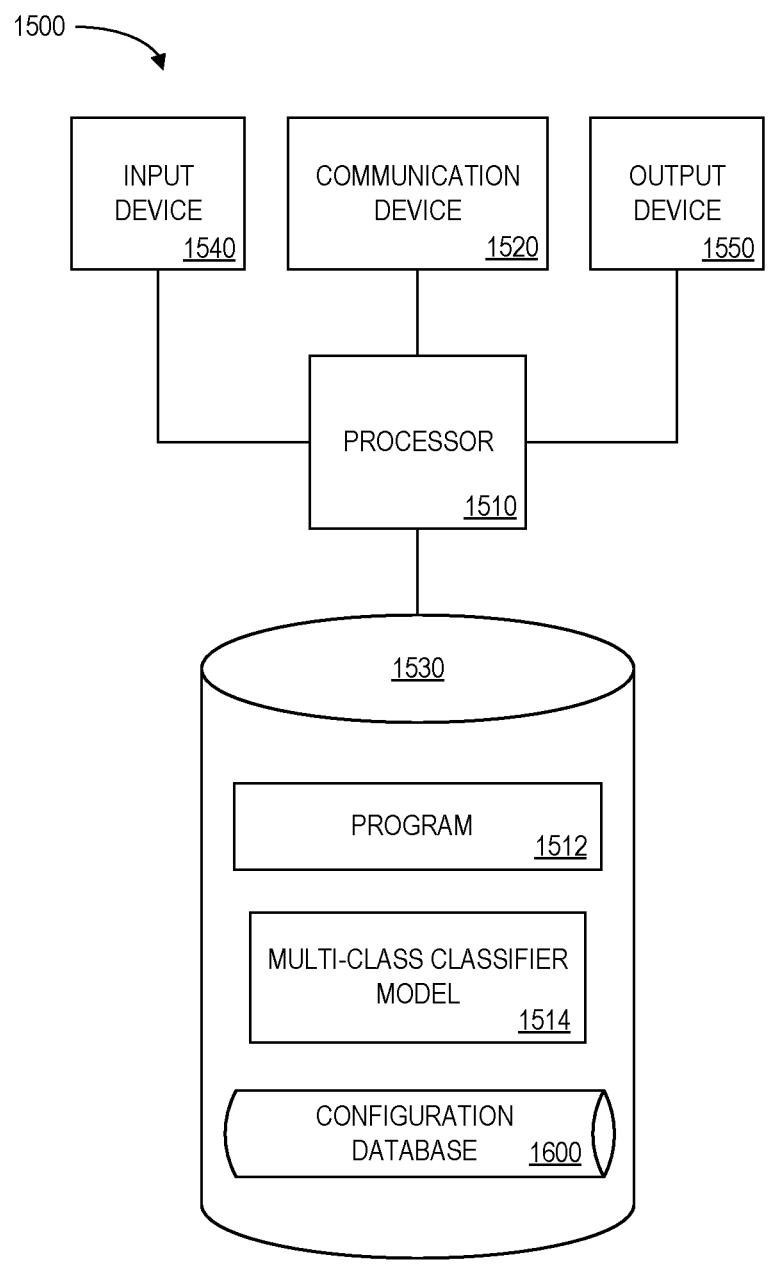
FIG. 15 is a block diagram of an industrial asset protection platform according to some embodiments of the present invention.

The embodiments described herein may be implemented using any number of different hardware configurations. For example, FIG. 15 is a block diagram of an industrial asset protection platform 1500 that may be, for example, associated with the system 100 of FIG. 1. The industrial asset protection platform 1500 comprises a processor 1510, such as one or more commercially available Central Processing Units ("CPUs") in the form of one-chip microprocessors, coupled to a communication device 1560 configured to communicate via a communication network (not shown in FIG. 15). The communication device 1560 may be used to communicate, for example, with one or more remote monitoring nodes, user platforms, digital twins, etc. The industrial asset protection platform 1500 further includes an input device 1540 (e.g., a computer mouse and/or keyboard to input adaptive and/or predictive modeling information) and/an output device 1550 (e.g., a computer monitor to render a display, provide alerts, transmit recommendations, and/or create reports). According to some embodiments, a mobile device, monitoring physical system, and/or PC may be used to exchange information with the industrial asset protection platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1516 and/or a multi-class classifier model 1514 for controlling the processor 1510. The processor 1510 performs instructions of the programs 1516, 1514, and thereby operates in accordance with any of the embodiments described herein. For example, the processor 1510 may access a normal space data source that stores, for each of a plurality of monitoring nodes, a series of normal monitoring node values that represent normal operation of an industrial asset. The processor 1510 may also access attacked and failure space data sources that stores a series of attacked and failure monitoring node values. The processor 1510 may generate sets of normal, attacked, and failure feature vectors and calculate and output a decision boundary for a multi-class classifier model based on the normal, attacked, and failure feature vectors. The plurality of monitoring nodes may then generate a series of current monitoring node values that represent a current operation of the industrial asset. The processor 1510 may receive the series of current values, generate a set of current feature vectors, execute the multi-class classifier model, and transmit a classification result based on the current feature vectors and the decision boundary.

The programs 1516, 1514 may be stored in a compressed, uncompiled and/or encrypted format. The programs 1516, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the industrial asset protection platform 1500 from another device; or (ii) a software application or module within the industrial asset protection platform 1500 from another software application, module, or any other source.

In some embodiments (such as the one shown in FIG. 15), the storage device 1530 further stores a configuration database 1600. An example of a database that may be used in connection with the industrial asset protection platform 1500 will now be described in detail with respect to FIG. 16. Note that the database described herein is only one example, and additional and/or different information may be stored therein. Moreover, various databases might be split or combined in accordance with any of the embodiments described herein.

Referring to FIG. 16, a table is shown that represents the classification database 1600 that may be stored at the industrial asset protection platform 1500 according to some embodiments. The table may include, for example, entries identifying industrial assets to be protected. The table may also define fields 1602, 1604, 1606, 1608, 1610, 1612 for each of the entries. The fields 1602, 1604, 1606, 1608, 1610, 1612 may, according to some embodiments, specify: an industrial asset identifier 1602, an industrial asset description 1604, a global classifier 1606, a local classifier 1608, a fault classifier 1610, and a status 1612. The configuration database 1600 may be created and updated, for example, when a new physical system is monitored or modeled, classifiers are trained, etc.

The industrial asset identifier 1602 and description 1604 may define a particular machine or system that will be protected. The global classifier 1606, local classifier 1608, and failure classifier 1610 might define, for a particular configuration being implemented for an industrial asset, a type of classifier (e.g., none, binary, 3-class, multi-class, etc.) that will be used to monitor for attacks and failures. The status 1612 might indicate whether the appropriate classifier have been trained.

Thus, embodiments may provide technical benefits including a construction of data sets for developing decision boundaries (an offline process) with pre-determined features and pre-determined configurations. Moreover, embodiments may use of features/feature extraction (a real-time process) with local and global features based on the desired configuration and online detection may be implemented with multi-class decision boundaries and features. In addition, postdecision analysis (such as passing alertness to on operator with specific fault/diagnostic information) may be facilitated and an appropriate fault-tolerant control or attack neutralization action might be automatically invoked. Further, embodiments may enable automatic detection and classification into attacks and different types of faults or system anomalies, provide an additional cyber layer of defense, and increase confidence that a rapid response to system faults can be achieved. Note that any of the configuration described herein might be implemented as an application and deployed to industrial asset sites, be controlled with a license key, and/or could be incorporated as an industrial asset monitoring service.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc.

Embodiments might be tested, for example, using data sets collected from simulation of a high-fidelity physics based gas turbine. For example, 20 monitoring nodes might be selected to create a collection of sensor, actuator and controller nodes. The generated data set might include a number of normal time series per node, consisting of different load levels and ambient conditions, a number of attack time series per node, designed using DoE (over multiple attack factors), and a number of fault time series per node simulated over different load levels and ambient conditions. The fault scenario might be, for example, based on a simulation of a single failure mode (a hard failure) of each node. In the simulation, a number of statistical features might be extracted for each monitoring node and classifiers might be trained using kernel ELM with a nonlinear kernel, namely Radial Basis Function ("RBF"). The number of neurons in the output layer of ELM may be automatically selected as well as the number of classes.

FIG. 17 is classification results according to some embodiments associated with a turbine exhaust gas temperature measurement ("TTXM"). Each classifier has three classes, normal (N), attack (A), and fault (F). The tables 1710, 1720 show the number and percentage of each actual class in the data vs. those predicted by the classifiers. In each table, the numbers of the main diagonal represent correct classifications while the numbers on the off-diagonals represent misclassifications. As seen in the tables, for both nodes, there is a complete separation between the fault class vs. normal and attack classes. For TTXM, the correct classification for attacks was 98.25%, with 1.64% misclassification into normal and 0.11% misclassification into fault. The correct classification for normal cases is 95.65%, with 4.35% misclassification into attack and without any misclassification into fault.

Figure 18:
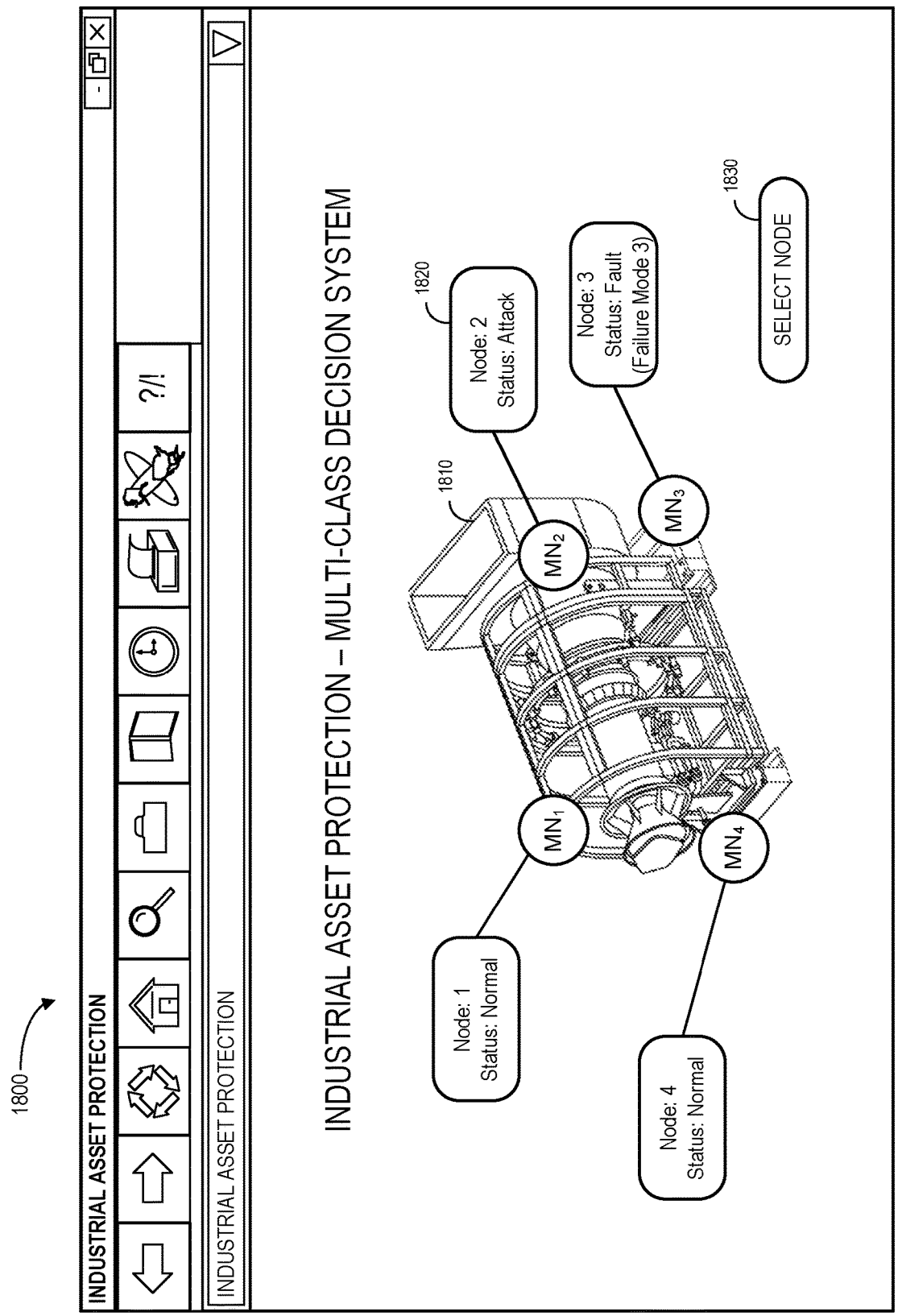
FIG. 18 is a multi-class decision system display in accordance with some embodiments.

FIG. 18 is a multi-class decision system display 1800 in accordance with some embodiments. The display 1800 includes information about an industrial asset 1810 having a number of monitoring nodes ($MN_1$ through $MN_2$). In particular, the display 1800 includes, for each node, an indication of a current status 1820 as determined by any of the embodiments described herein. According to some embodiments, the display 1800 is interactive and may be used by an operator to determine more detailed information (e.g., via selection of an icon 1830) and/or to adjust the operation of the system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of monitoring nodes each generating a series of current monitoring node values over time that represent a current operation of the industrial asset; and
a node classifier computer, coupled to the plurality of monitoring nodes, to:
(i) receive the series of current monitoring node values and generate a set of current feature vectors, wherein information from each of the plurality of monitoring nodes is normalized and an output is expressed as a weighted linear combination of basis functions,
(ii) access at least one multi-class classifier model having at least one decision boundary, and
(iii) execute the at least one multi-class classifier model and transmit a classification result based on the set of current feature vectors and the at least one decision boundary, wherein the classification result indicates whether a monitoring node status is normal, attacked, or fault.

2. The system of claim 1, wherein at least one monitoring node is associated with at least one of: (i) a sensor node, (ii) a critical sensor node, (iii) an actuator node, (iv) a controller node, and (v) a key software node.

3. The system of claim 1, wherein the classification result further includes, in the case of a monitoring node status indicating a fault, a failure mode.

4. The system of claim 1, wherein the set of current feature vectors includes at least one of: (i) a local feature vector associated with a particular monitoring node, and (ii) a global feature vector associated with a plurality of monitoring nodes.

5. The system of claim 1, wherein the set of current feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

6. The system of claim 1, wherein the multi-class classifier model is associated with at least one of: (i) an actuator attack, (ii) a controller attack, (iii) a monitoring node attack, (iv) a plant state attack, (v) spoofing, (vi) financial damage, (vii) unit availability, (viii) a unit trip, (ix) a loss of unit life, and (x) asset damage requiring at least one new part.

7. The system of claim 1, wherein the at least one decision boundary is associated with at least one of: (i) a line, (ii) a hyperplane, and (iii) a non-linear boundary.

8. The system of claim 1, wherein said executing includes:
determining, by a global binary classifier, whether the industrial asset is normal or abnormal;
when the industrial asset is abnormal, determining, by a 3-class classifier for each monitoring node, whether the node is normal, attacked, or faulty; and
when a node is faulty, determining, by a multi-class classifier for each monitoring node, a failure mode for the monitoring node.

9. The system of claim 1, wherein said executing includes
determining, by a global binary classifier, whether the industrial asset is normal or abnormal; and
when the industrial asset is abnormal, determining, by a multi-class classifier for each monitoring node, whether the node is normal, attacked, or one of a pre-determined number of failure modes.

10. The system of claim 1, wherein said executing includes
determining, by a 3-class classifier for each monitoring node, whether the node is normal, attacked, or faulty; and
when a node is faulty, determining, by a multi-class classifier for each monitoring node, a failure mode for the monitoring node.

11. The system of claim 1, wherein said executing includes
determining, by a multi-class classifier for each monitoring node, whether the node is normal, attacked, or faulty, or one of a pre-determined number of failure modes.

12. The system of claim 1, wherein said executing includes
determining, by global multi-class classifier, whether each monitoring node is normal or abnormal;
when a monitoring node is abnormal, determining, by a binary classifier for each monitoring node, whether the node is attacked or faulty; and
when a node is faulty, determining, by a multi-class classifier for each monitoring node, a failure mode for the monitoring node.

13. The system of claim 1, wherein said executing includes
determining, by global multi-class classifier, whether each monitoring node is normal or abnormal;
when a monitoring node is abnormal, determining, by a binary classifier for each monitoring node, whether the node is attacked or one of a pre-determined number of failure modes.

14. The system of claim 1, further comprising:
a normal space data source storing, for each of the plurality of monitoring nodes, a series of normal monitoring node values over time that represent normal operation of the industrial asset;
an attacked space data source storing, for each of the plurality of monitoring nodes, a series of attacked monitoring node values over time that represent attacked operation of the industrial asset;
a faulty space data source storing, for each of the plurality of monitoring nodes, a series of faulty monitoring node values over time that represent faulty operation of the industrial asset; and
a multi-class classifier model creation computer, coupled to the normal space data source, the attacked space data source, and the fault space data source, to:
(i) receive the series of normal monitoring node values and generate a set of normal feature vectors,
(ii) receive the series of attacked monitoring node values and generate a set of attacked feature vectors,
(iii) receive the series of faulty monitoring node values and generate a set of faulty feature vectors, and
(iv) automatically calculate and output the at least one decision boundary for the multi-class classifier model based on the set of normal feature vectors, the set of attacked feature vectors, and the set of faulty feature vectors.

15. The system of claim 14, wherein at least one of the series of normal monitoring node values, the series of attacked monitoring node values, and the series of faulty monitoring node values are associated with a high fidelity equipment model.

16. The system of claim 14, wherein at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

17. The system of claim 14, wherein at least one of the normal, attacked, and faulty monitoring node values are obtained by running design of experiments on an industrial control system associated with at least one of: (i) a turbine, (ii) a gas turbine, (iii) a wind turbine, (iv) an engine, (v) a jet engine, (vi) a locomotive engine, (vii) a refinery, (viii) a power grid, and (ix) an autonomous vehicle.

18. A computerized method to protect an industrial asset, comprising:
receiving, from a normal space data source for each of a plurality of monitoring nodes, a series of normal monitoring node values over time that represent normal operation of the industrial asset;
receiving, from an attacked space data source for each of the plurality of monitoring nodes, a series of attacked monitoring node values over time that represent attacked operation of the industrial asset;
receiving, from a fault space data source for each of the plurality of monitoring nodes, a series of fault monitoring node values over time that represent fault operation of the industrial asset;
automatically calculating and outputting, by a multi-class classifier model creation computer, at least one decision boundary for a multi-class classifier model based on the set of normal feature vectors, the set of attacked feature vectors, and the set of fault feature vectors;
receiving, from the plurality of monitoring nodes, a series of current monitoring node values over time that represent a current operation of the industrial asset, wherein information from each of the plurality of monitoring nodes is normalized and an output is expressed as a weighted linear combination of basis functions;
generating, by a node classifier computer, a set of current feature vectors;
accessing the multi-class classifier model having the at least one decision boundary; and
executing the multi-class classifier model and transmitting a classification result based on the set of current feature vectors and the at least one decision boundary, wherein the classification result indicates whether a monitoring node status is normal, attacked, or fault.

19. A non-transitory, computer-readable medium storing instructions that, when executed by a computer processor, cause the computer processor to perform a method to protect an industrial asset, the method comprising:

receiving, from a normal space data source for each of a plurality of monitoring nodes, a series of normal monitoring node values over time that represent normal operation of the industrial asset;

receiving, from an attacked space data source for each of the plurality of monitoring nodes, a series of attacked monitoring node values over time that represent attacked operation of the industrial asset;

receiving, from a fault space data source for each of the plurality of monitoring nodes, a series of faulty monitoring node values over time that represent faulty operation of the industrial asset;

automatically calculating and outputting, by a multi-class classifier model creation computer, at least one decision boundary for a multi-class classifier model based on the set of normal feature vectors, the set of attacked feature vectors, and the set of faulty feature vectors;

receiving, from the plurality of monitoring nodes, a series of current monitoring node values over time that represent a current operation of the industrial asset, wherein information from each of the plurality of monitoring nodes is normalized and an output is expressed as a weighted linear combination of basis functions;

generating, by a node classifier computer, a set of current feature vectors;

accessing the multi-class classifier model having the at least one decision boundary; and executing the multi-class classifier model and transmitting a classification result based on the set of current feature vectors and the at least one decision boundary, wherein the classification result indicates whether a monitoring node status is normal, attacked, or faulty.

20. A system to protect an industrial asset, comprising:

a normal space data source storing, for each of the plurality of monitoring nodes, a series of normal monitoring node values over time that represent normal operation of the industrial asset;

an attacked space data source storing, for each of the plurality of monitoring nodes, a series of attacked monitoring node values over time that represent attacked operation of the industrial asset;

a faulty space data source storing, for each of the plurality of monitoring nodes, a series of faulty monitoring node values over time that represent faulty operation of the industrial asset;

a multi-class classifier model creation computer, coupled to the normal space data source, the attacked space data source, and the fault space data source, to:

receive the series of normal monitoring node values and generate a set of normal feature vectors, receive the series of attacked monitoring node values and generate a set of attacked feature vectors, receive the series of faulty monitoring node values and generate a set of faulty feature vectors, and automatically calculate and output the at least one decision boundary for the multi-class classifier model based on the set of normal feature vectors, the set of attacked feature vectors, and the set of faulty feature vectors;

a plurality of monitoring nodes each generating a series of current monitoring node values over time that represent a current operation of the industrial asset; and a node classifier computer, coupled to the plurality of monitoring nodes, to:

receive the series of current monitoring node values and generate a set of current feature vectors, wherein information from each of the plurality of monitoring nodes is normalized and an output is expressed as a weighted linear combination of basis functions, access at least one multi-class classifier model having at least one decision boundary, and execute the at least one multi-class classifier model and transmit a classification result based on the set of current feature vectors and the at least one decision boundary, wherein the classification result indicates whether a monitoring node status is normal, attacked, or fault.

* * * * *